(12) United States Patent
Guo et al.

(10) Patent No.: US 11,930,202 B2
(45) Date of Patent: Mar. 12, 2024

(54) METHOD AND APPARATUS FOR VIDEO WATERMARKING, AND STORAGE MEDIUM

(71) Applicant: BEIJING MICROLIVE VISION TECHNOLOGY CO., LTD, Beijing (CN)

(72) Inventors: He Guo, Beijing (CN); Jianqiang He, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 809 days.

(21) Appl. No.: 16/979,255

(22) PCT Filed: Jan. 25, 2019

(86) PCT No.: PCT/CN2019/073196
§ 371 (c)(1),
(2) Date: Sep. 9, 2020

(87) PCT Pub. No.: WO2020/062744
PCT Pub. Date: Apr. 2, 2020

(65) Prior Publication Data
US 2020/0404309 A1 Dec. 24, 2020

(30) Foreign Application Priority Data

Sep. 30, 2018 (CN) .......................... 201811161606.8

(51) Int. Cl.
*H04N 19/467* (2014.01)
*H04N 21/2343* (2011.01)
(Continued)

(52) U.S. Cl.
CPC ....... *H04N 19/467* (2014.11); *H04N 21/2343* (2013.01); *H04N 21/2347* (2013.01); *H04N 21/4382* (2013.01); *H04N 21/8358* (2013.01)

(58) Field of Classification Search
CPC .................................................... H04N 19/467
(Continued)

(56) References Cited

U.S. PATENT DOCUMENTS

2006/0107056 A1   5/2006  Bhatt et al.
2011/0126250 A1*  5/2011  Turner ............... H04N 7/17318
                                                         725/109
(Continued)

FOREIGN PATENT DOCUMENTS

CN          1604647 A      4/2005
CN        101661608 A      3/2010
(Continued)

OTHER PUBLICATIONS

2nd Office Action dated Apr. 6, 2021 for Chinese Patent Application No. 201811161606.8.
(Continued)

*Primary Examiner* — Anthony D Brown
(74) *Attorney, Agent, or Firm* — Thomas | Horstemeyer, LLP

(57) ABSTRACT

Disclosed are method and apparatus for video watermarking, an electronic device and a storage medium. The method includes steps described below. Image data of a target video frame is converted from an RGB format to a YUV format; in the YUV format, an offset with a preset value is superimposed on a pixel value of a pixel point corresponding to a shape be watermarked on the target video frame; and the target video frame on which the offset is superimposed is encoded.

15 Claims, 3 Drawing Sheets

(51) Int. Cl.
*H04N 21/2347* (2011.01)
*H04N 21/438* (2011.01)
*H04N 21/8358* (2011.01)

(58) Field of Classification Search
USPC .......................................................... 380/201
See application file for complete search history.

(56) References Cited

U.S. PATENT DOCUMENTS

2013/0259294 A1   10/2013   Mehta et al.
2016/0350890 A1*  12/2016   Kato .................. H04N 1/32208

FOREIGN PATENT DOCUMENTS

| CN | 101938618 A | 1/2011 |
| CN | 102905127 A | 1/2013 |
| CN | 103458320 A | 12/2013 |
| CN | 106454182 A | 2/2017 |
| CN | 106507130 A | 3/2017 |
| CN | 107749990 A | 3/2018 |
| CN | 107911698 A | 4/2018 |
| CN | 108174137 A | 6/2018 |
| TW | 201413637 A | 4/2014 |

OTHER PUBLICATIONS

Supplemental Search Report dated Mar. 29, 2021 for Chinese Patent Application No. 201811161606.8.
Supplemental Search Report for CN Application No. 201811161606.8 dated Aug. 12, 2021.
Notice of Rejection for CN Application No. 201811161606.8 dated Aug. 23, 2021.
Yang et al., Information Hiding and Digital Watermarking, Oct. 31, 2017 pp. 80-81.
International Search Report and Written Opinion dated Jun. 20, 2019 for PCT Patent Application No. PCT/CN2019/073196. English Translation Provided.
1st Search Report dated Jul. 14, 2020 for Chinese Patent Application No. 20181116160608. English Translation Provided.
1st Office Action dated Jul. 29, 2020 for Chinese Patent Application No. 20181116160608. English Translation Provided.

* cited by examiner

METHOD AND APPARATUS FOR VIDEO WATERMARKING, AND STORAGE MEDIUM

CROSS-REFERENCE TO RELATED APPLICATIONS

This is a National Stage Application, filed under 35 U.S.C. 371, of International Patent Application No. PCT/CN2019/073196, filed on Jan. 25, 2019, which claims the priority of Chinese patent application No. 201811161606.8, filed with the Chinese Patent Office on Sep. 30, 2018, contents of both of which are incorporated herein by reference in its entirety.

TECHNICAL FIELD

Embodiments of the present disclosure relate to the field of Internet technologies and, for example, to a method and apparatus for video watermark, and device a storage medium.

BACKGROUND

At present, people pay more and more attention to copyright protection, especially to audio-visual works, digital books and so on. Therefore, in case of not destroying an original work, the copyright protection and tracking are usually implemented by adding a blind watermark. The blind watermark refers to a watermark which may not be perceived by people under a normal condition and may only be visible through a special method.

Currently, a common method for adding a blind watermark is to transform an image from time domain to frequency domain by Fourier transform, the image is watermarked in frequency domain, and then converted from frequency domain to time domain by inverse Fourier transform, so as to obtain a watermarked image. However, when the blind watermark is added using this method, the entire image needs to be converted while the image is converted from time domain to frequency domain, which requires a large amount of calculations and a complicated conversion process.

SUMMARY

The present disclosure provides a method and apparatus for video watermarking, an electronic device, and a storage medium, to overcome defects existing upon video watermarking in frequency domain in the related arts, i.e., a large amount of calculations and a complicated conversion process.

The present disclosure provides a method for video watermarking. The method includes: image data of a target video frame is converted from a red-green-blue (RGB) format to a luma and chroma (YUV) format; in the YUV format, an offset with a preset value is superimposed on a pixel value of a pixel point corresponding to a shape to be watermarked on the target video frame; and the target video frame on which the offset is superimposed is encoded.

The present disclosure further provides an apparatus for video watermarking. The apparatus includes a conversion module, an offset module and an encoding module. The conversion module is configured to convert image data of a target video frame from an RGB format to a YUV format. The offset module is configured to, in the YUV format, superimpose an offset with a preset value on a pixel value of a pixel point corresponding to a shape to be watermarked on the target video frame. The encoding module is configured to encode the target video frame on which the offset is superimposed.

The present disclosure further provides an electronic device. The electronic device includes one or more processing apparatuses and a storage apparatus. The storage apparatus is configured to store one or more programs. The one or more programs, when executed by the one or more processing apparatus, cause the one or more processing apparatuses to implement the method for video watermarking according to the present disclosure.

The present disclosure further provides a computer-readable storage medium. A computer program is stored on the computer-readable storage medium. The program, when executed by a processing apparatus, implements the method for video watermarking according to the present disclosure.

DETAILED DESCRIPTION

Figure 1A:
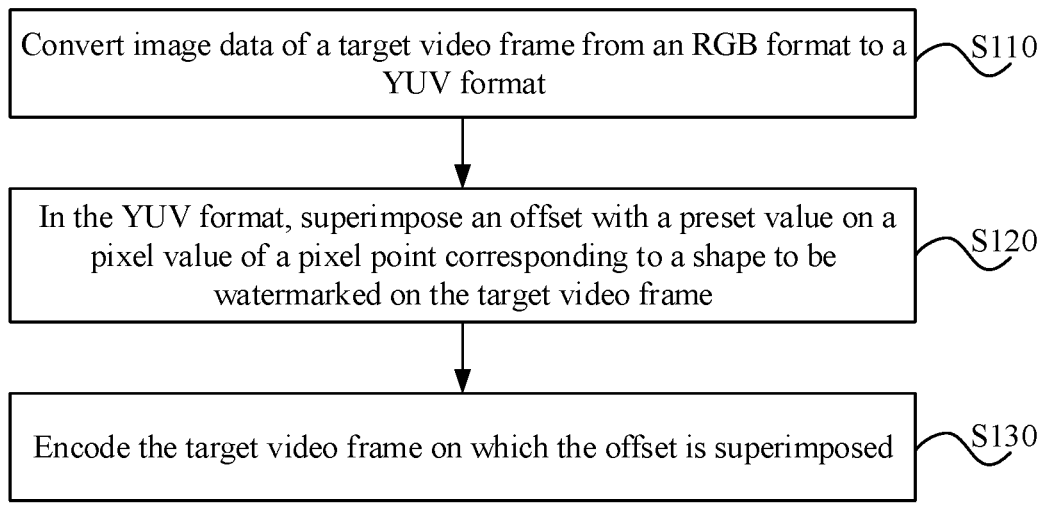
FIG. 1a is a flowchart of a method for video watermarking according to an embodiment of the present disclosure.

The present disclosure will be further described in detail in conjunction with the drawings and embodiments below. It should be understood that the embodiments described herein are merely used for explaining the present disclosure and are not intended to limit the present disclosure. It should also be noted that, for ease of description, only a part, but not all, of structures related to the present disclosure are shown in the drawings.

FIG. 1a is a flowchart of a method for video watermarking according to an embodiment of the present disclosure. This embodiment is applicable to a case of adding a video watermark to a video. The method may be executed by an apparatus for video watermarking, this apparatus may be implemented by at least one of software or hardware and may be configured in an electronic device. As shown in FIG. 1a, the method includes step S110, step S120 and step S130.

In step S110, image data of a target video frame is converted from an RGB format to a YUV format.

In this embodiment, the target video frame is a video frame to be watermarked determined from an original video, and when the target video frame is determined, for example, the target video frame may be extracted according to one of following rules 1) to 3).

1) The target video frame is extracted every predetermined number of frames, and in particular, the target video frame is extracted every how many frames, which may be determined according to actual requirements. In this embodiment, for example, the target video frame may be extracted every 5 frames.

2) All video frames within a preset time period are taken as the target video frame. For example, all video frames within 3 seconds of head, end and middle in the original video may be selected as the target video frame.

3) A video frame extracted through a random algorithm is taken as the target video frame.

Due to modern display technologies, almost a color of any visible light is achieved by combining three primary colors with different intensities, i.e., red, green and blue. When an image is stored, the image may be recorded by recording each intensity of red, green and blue for each pixel. Image data of the extracted target video frame is also in the RGB format. Three channels of RGB data may be converted into one channel (Y, also called luma) representing luminance and two channels (UV, also called chroma) representing chrominance by mathematical formulas, so as to convert the image data in the RGB format into image data in the YUV format to facilitate transmission. In addition, at present, a video is usually compressed and coded based on a YUV color space before the video is stored.

In step S120, in the YUV format, an offset with a preset value is superimposed on a pixel value of a pixel point corresponding to a shape to be watermarked on the target video frame.

Figure 1B:
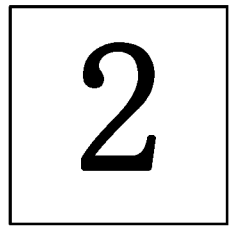
FIG. 1b is a schematic diagram of a watermark according to an embodiment of the present disclosure.

In this embodiment, the shape to be watermarked is determined by processing the watermark to be added, for example, an image composed of pixel points with non-zero watermark data is determined as the shape to be watermarked, such as the watermark shown in FIG. 1b. A character composed of pixel points with non-zero pixel data in a rectangular frame is determined as "2", that is, the character "2" is the shape to be watermarked. The pixel points corresponding to the shape to be watermarked on the target video frame are determined, and pixel values of these pixel points are superimposed with the offset with the preset value, so that the addition of the watermark may be implemented. Because the watermark is added in the YUV format, and human eyes are more sensitive to changes in brightness and not sensitive to changes in color, the watermark may be added by modifying U-channel data or V-channel data, so as to greatly ensure invisibility of the watermark. Therefore, in an implementation, the offset with the preset value is superimposed on the U-channel data or the V-channel data of the pixel points corresponding to the shape to be watermarked on the target video frame, the addition of the watermark is realized. The preset value may exemplarily be any value between 1 and 3.

In step S130, the target video frame on which the offset is superimposed is encoded.

For the target video frame in the YUV format superimposed with the offset, the target video frame may be directly encoded and compressed for storage or release of a subsequent video.

In an embodiment of the present disclosure, the image data of the target video frame is converted from the RGB format to the YUV format, and in the YUV format, the offset with the preset value is superimposed on the U-channel data or the V-channel data of the pixel points corresponding to the shape to be watermarked on the target video frame, so that the video watermark may be added, and only the target video frame on which the offset is superimposed needs to be compressed and encoded. Therefore, in a case of no conversion between time domain and frequency domain, a real-time addition of a video watermark is realized, complexity of a watermarking process is reduced, and efficiency of video watermarking is improved.

Figure 2:
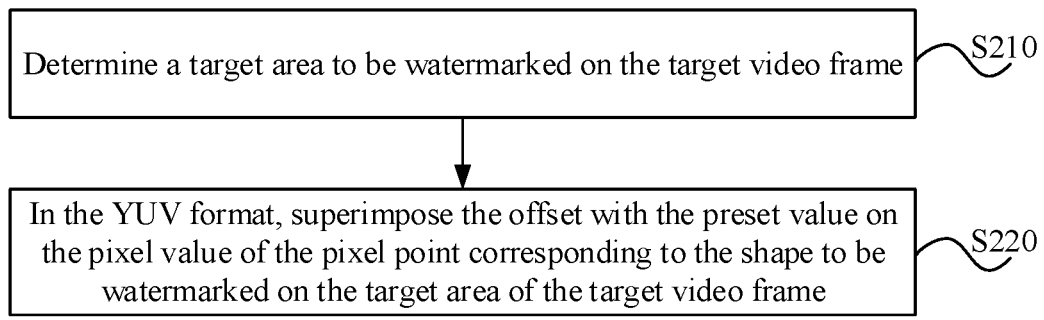
FIG. 2 is a flowchart of a method for video watermarking according to an embodiment of the present disclosure.

Reference is made to FIG. 2 below, which shows a flowchart of a method for video watermarking according to an embodiment of the present disclosure. As shown in FIG. 2, the step in which the offset with the preset value is superimposed on the pixel value of the pixel point corresponding to the shape to be watermarked on the target video frame includes step S210 and step S220.

In step S210, a target area to be watermarked on the target video frame is determined.

The target area is a corresponding area on an image of the target video frame determined according to a display content on a user operation interface displaying the target video frame.

In this embodiment, after the image data of the target video frame is converted from the RGB format to the YUV format, the target area to be watermarked is determined on the target video frame in the YUV format. In order to ensure concealment of the watermark and no influence on viewing a video subject, the target area may be a corresponding area on the image of the target video frame determined according to the display content on the user interface (UI) displaying the target video frame. For example, an area on the image of the target video frame corresponding to a part with concentrated words displayed on the UI is taken as the target area.

In step S220, in the YUV format, the offset with the preset value is superimposed on the pixel value of the pixel point corresponding to the shape to be watermarked on the target area of the target video frame.

In this embodiment, for the image data in the YUV format in the target area, pixel points corresponding to the shape to be watermarked in the target area are determined, and pixel values of these pixel points are superimposed with the offset with the preset value. In an implementation, the offset with the preset value may be superimposed on U-channel data or V-channel data of the pixel points corresponding to the shape to be watermarked on the target video frame. The preset value may exemplarily be any value between 1 and 3.

In an embodiment, for pixel points which are relatively highlighted in the target area, for example, a certain pixel point in the target area with a relatively dark color, and its neighbor pixel points with a relatively light color, no offset may be performed on this pixel point. That is, in order to avoid influence on the original image and ensure the invisibility of the watermark, it is necessary to determine in advance whether the pixel points corresponding to the shape to be watermarked in the target area meet conditions for offsetting. For example, if a difference value between a pixel value of a pixel point in the target area and an average value of pixel values of multiple pixel points in a neighborhood of the pixel point does not exceed a preset threshold, the offset is superimposed on the pixel point. For example, the preset threshold is 10, a UN-channel data pixel value of a certain pixel point is 128, the average value of the pixel values of multiple pixel points in the neighborhood of this pixel point is 100, and the difference value of 28 is greater than the preset threshold of 10, therefore this pixel point does not need to be offset.

In an embodiment of the present disclosure, the target area is determined on the target video frame in the YUV format, and the offset with the preset value is superimposed on the U-channel data or the V-channel data of the pixel points corresponding to the shape to be watermarked on the target area of the target video frame, so that the addition of the watermark may be achieved. In an embodiment of the present disclosure, the real-time addition of the video watermark in the video frame in the time domain may be implemented without converting image data of a video frame to frequency domain. Therefore, in a case of no conversion between time domain and frequency domain, format conversion and offset are performed only on image data in the target area, the real-time addition of the video watermark is realized, the complexity of a watermarking process is reduced, and the efficiency of video watermarking is improved.

Figure 3:
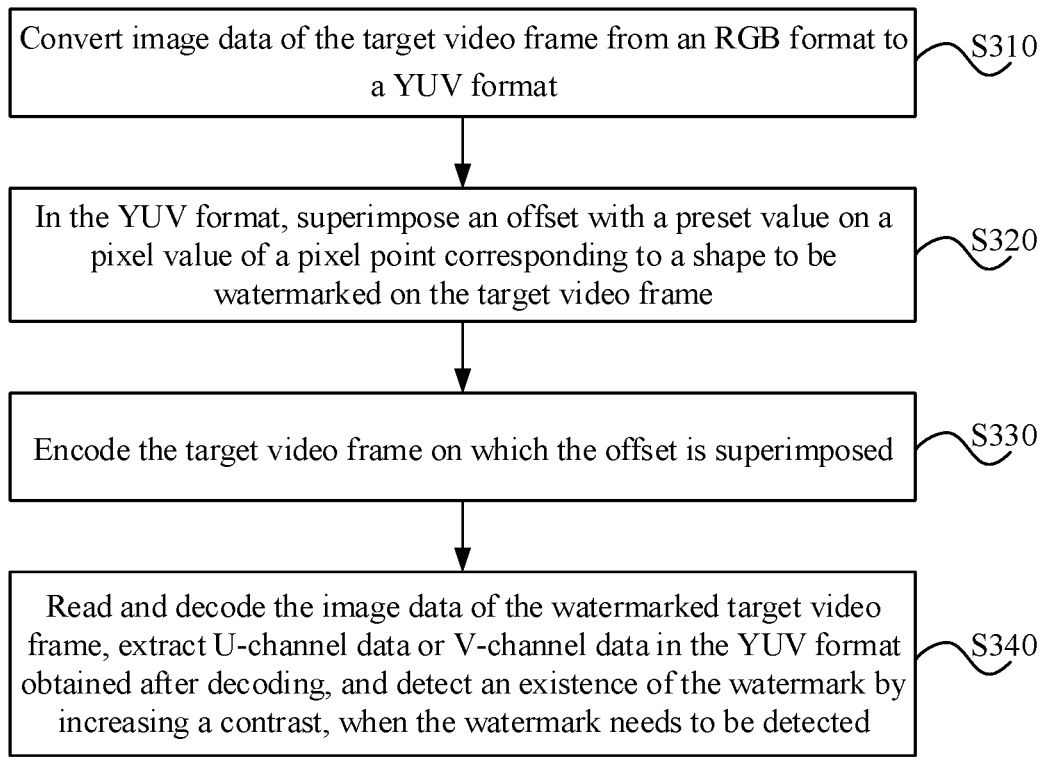
FIG. 3 is a flowchart of a method for video watermarking according to an embodiment of the present disclosure.

Reference is made to FIG. 3 below, which shows a flowchart of a method for video watermarking according to an embodiment of the present disclosure. As shown in FIG. 3, the method includes step S310 to step S340.

In step S310, image data of a target video frame is converted from an RGB format to a YUV format.

In step S320, in the YUV format, an offset with a preset value is superimposed on a pixel value of a pixel point corresponding to a shape to be watermarked on the target video frame.

In step S330, the target video frame on which the offset is superimposed is encoded.

In step S340, when the watermark needs to be detected, the image data of the watermarked target video frame is read and decoded, U-channel data or V-channel data in the YUV format obtained after decoding is extracted, and an existence of the watermark is detected by increasing a contrast.

In an embodiment, for a case of determining infringement, the video watermark needs to be detected, image data of one or more watermarked target video frames is read and decoded according to a rule for selecting a target video frame, the U-channel data or V-channel data in the YUV format obtained after decoding is extracted, and whether the watermark exists may be viewed through naked eyes by increasing the contrast, e.g., up to 30%, so that an authentication is realized.

In an embodiment of the present disclosure, during the authentication, the watermark in the video may be detected only by extracting the U-channel data or the V-channel data in the decoded image data in the YUV format and increasing the contrast, so that a fast authentication of the video may be implemented.

Figure 4:
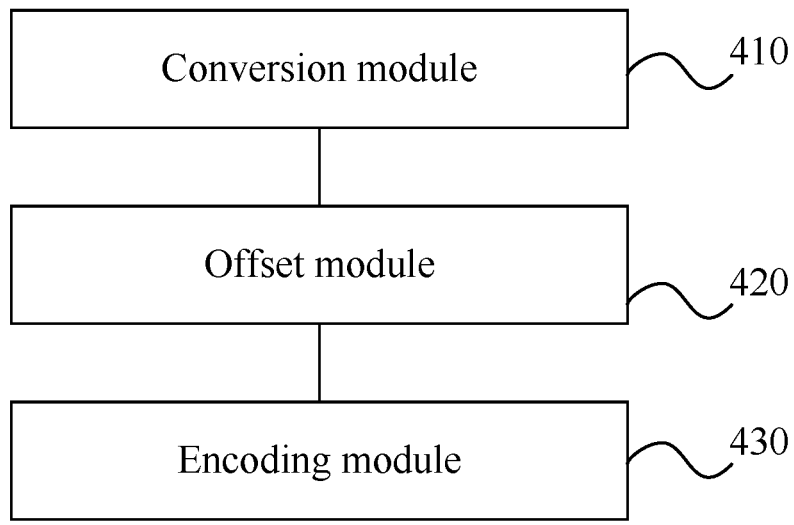
FIG. 4 is a schematic structural diagram of an apparatus for video watermarking according to an embodiment of the present disclosure.

Reference is made to FIG. 4 below, which shows a schematic structural diagram of an apparatus for video watermarking according to an embodiment of the present disclosure. This embodiment is applicable to a case of adding a blind watermark to a recorded video. As shown in FIG. 4, the apparatus for video watermarking includes a conversion module 410, an offset module 420 and an encoding module 430.

The conversion module 410 is configured to convert image data of a target video frame from an RGB format to a YUV format.

The offset module 420 is configured to, in the YUV format, superimpose an offset with a preset value on a pixel value of a pixel point corresponding to a shape to be watermarked on the target video frame.

The encoding module 430 is configured to encode the target video frame on which the offset is superimposed.

In this embodiment, after the conversion module converts the image data of the target video frame from the RGB format to the YUV format, the offset module superimposes the offset with the preset value on the pixel value of the pixel point corresponding to the shape to be watermarked on the target video frame, such that the addition of the watermark may be realized, and the encoding module encodes and compresses the target video frame on which the offset is superimposed, so as to facilitate subsequent transmission. Therefore, in a case of no conversion between time domain and frequency domain, the real-time addition of the video watermark is realized, the complexity of a watermarking process is reduced, and the efficiency of video watermarking is improved.

Based on the above embodiments, the target video frame is a video frame to be watermarked determined from an original video according to one of following rules: a video frame extracted every predetermined number of frames, all video frames within a preset time period, or a video frame extracted through a random algorithm.

In an embodiment, the offset module is configured to determine a target area to be watermarked on the target video frame, where the target area is a corresponding area on an image of the target video frame determined according to a display content on a user operation interface displaying the target video frame; and the offset module is configured to superimpose the offset with the preset value on the pixel value of the pixel point corresponding to the shape to be watermarked on the target area of the target video frame.

In an embodiment, the offset module is further configured to superimpose the offset with the preset value on U-channel data or V-channel data of the pixel point corresponding to the shape to be watermarked on the target video frame.

In an embodiment, the pixel point on which the offset is superimposed further has following characteristics: a difference value between the pixel value of the pixel point and an average value of pixel values of multiple pixel points in a neighborhood of the pixel point does not exceed a preset threshold.

In an embodiment, the apparatus further includes a detection module.

When the watermark needs to be detected, the detection module is configured to read and decode image data of the watermarked target video frame, extract the U-channel data or V-channel data in the YUV format obtained after decoding, and detect an existence of the watermark by increasing a contrast.

The apparatus for video watermarking provided by an embodiment of the present disclosure may implement the method for video watermarking provided by any embodiment of the present disclosure, and has corresponding functional modules and beneficial effects of executing the method.

Figure 5:
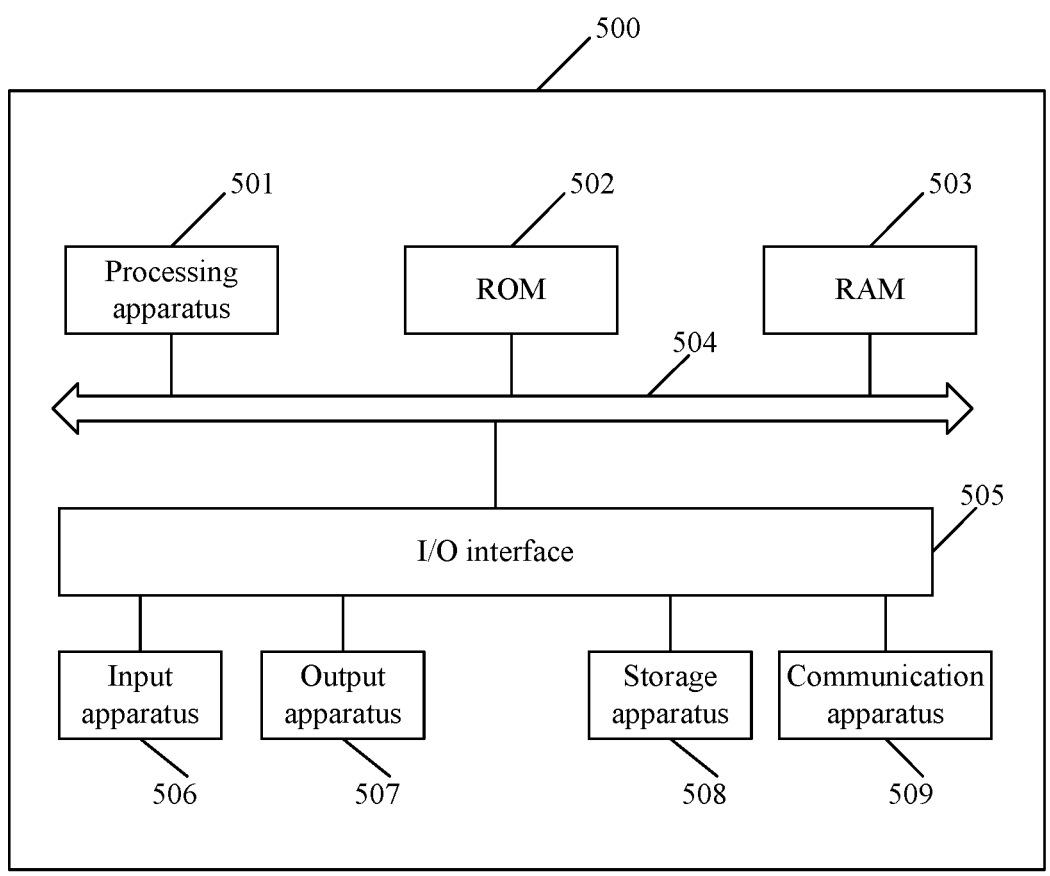
FIG. 5 is a schematic structural diagram of an electronic device in an embodiment of the present disclosure.

Reference is made to FIG. 5 below, which shows a schematic structural diagram of an electronic device (such as a terminal device or a server) 500 applicable to implement an embodiment of the present disclosure. The terminal device in an embodiment of the present disclosure may include, but is not limited to, a mobile terminal such as a mobile phone, a notebook computer, a digital broadcast receiver, a personal digital assistant (PDA), a portable android device (PAD), a portable media player (PMP) and an in-vehicle terminal (e.g., an in-vehicle navigation terminal), as well as a fixed terminal such as a television (TV), a desktop computer. The electronic device shown in FIG. 5 is merely an example and should not bring any limitation on functions and use scope of embodiments of the present disclosure.

As shown in FIG. 5, the electronic device 500 may include a processing apparatus (for example, a central processor, a graphics processor) 501, which may perform various appropriate actions and processes based on a program stored in a read-only memory (ROM) 502 or a program loaded into a random access memory (RAM) 503 from a storage apparatus 508. In the RAM 503, various programs and data required for an operation of the electronic device 500 are also stored. The processing apparatus 501, ROM 502 and RAM 503 are connected to each other through a bus 504. An input/output (I/O) interface 505 is further connected to the bus 504.

Generally, following apparatuses may be connected to the I/O interface 505: including an input apparatus 506, an output apparatus 507, the storage apparatus 508 and a communication apparatus 509. The input apparatus 506 includes, for example, a touch screen, a touch pad, a keyboard, a mouse, a camera, a microphone, an accelerometer, a gyroscope. The output apparatus 507 includes, for example, a liquid crystal display (LCD), a speaker and a vibrator. The storage apparatus 508 includes, for example, a magnetic tape and a hard disk. The communication apparatus 509 may allow the electronic device 500 to perform wireless or wired communications with other devices to exchange data. Although FIG. 5 shows the electronic device 500 having various apparatuses, it should be understood that it is not required that all of illustrated apparatuses be implemented or provided, but rather that more or fewer apparatuses may be implemented or provided instead.

In particular, according to the embodiments of the present disclosure, the processes described above with reference to the flowcharts may be implemented as a computer software program. For example, an embodiment of the present disclosure provides a computer program product including a computer program carried by a computer-readable medium, the computer program contains program codes for implementing the method shown in the flowcharts. In a such embodiment, the computer program may be downloaded and installed from a network through the communication apparatus 509, or installed from the storage apparatus 508, or installed from the ROM 502. When the computer program is executed by the processing apparatus 501, it executes the above-described functions defined in the method of the embodiments of the present disclosure.

It should be noted that the above-described computer-readable medium of the present disclosure may be a computer-readable signal medium, or a computer-readable storage medium, or any combination of the computer-readable signal medium and the computer-readable storage medium. The computer-readable storage medium may be, for example, but not limited to, an electronic, magnetic, optical, electromagnetic, infrared, or semiconductor system, apparatus, or device, or any combination thereof. More examples of the computer-readable storage media may include, but are not limited to: electrical connections with one or more wires, a portable computer magnetic disk, a hard disk, a RAM, a ROM, an erasable programmable read only memory (EPROM or a flash), an optical fiber, a compact disc read-only memory (CD-ROM), an optical storage device, a magnetic storage device, or any suitable combination thereof. In this disclosure, the computer-readable storage medium may be any tangible medium that contains or stores a program, which may be used by or in combination with an instruction execution system, apparatus, or device. In this disclosure, the computer-readable signal medium may include a data signal that is contained in a baseband or propagated as a part of a carrier wave, and the data signal carries a computer-readable program code. Such a propagated data signal may take many forms, including but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for being used by or in combination with the instruction execution system, apparatus, or device. The program code contained in the computer-readable medium may be transmitted by using any appropriate medium, including but not limited to an electric wire, an optical cable, a radio frequency (RF), etc., or any suitable combination thereof.

The above-described computer-readable medium may be included in the above-described electronic device, or it may exist alone without being assembled into the electronic device.

The above-described computer-readable medium carries one or more programs, and the above-described one or more programs, when executed by the electronic device, cause the electronic device to perform the above methods.

Alternatively, the above-described computer-readable medium carries one or more programs, and the above-described one or more programs, when executed by this electronic device, cause the electronic device to perform the above methods.

A computer program code for performing the operations of the present disclosure may be written in one or more programming languages or combinations thereof, the above-described programming languages include an object-oriented programming language—such as Java, Smalltalk, C++, and further include a conventional procedural programming language—such as a "C" language or similar programming language. The program code may be executed in a following manner: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

The flowchart and block diagram in the drawings illustrate the architecture, functionality, and operation of possible implementations of the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, which depends upon the involved functionality. It should also be noted that each block of at least one of the block diagram or the flowchart, and combinations of blocks of at least one of the block diagram or the flowchart, may be implemented by a dedicated hardware-based system that performs a specified function or operation, or by a combination of a dedicated hardware and a computer instruction.

The unit described in the embodiments of the present disclosure may be implemented by a software or a hardware. The name of the unit does not constitute a limitation on the unit itself in some cases.

What is claimed is:

1. A method for video watermarking, being implemented by an electronic device and comprising:
   determining, from an original video, a video frame to be watermarked in a preset manner to be a target video frame, wherein the preset manner comprises one of the following: extracting a video frame every predetermined number of frames, extracting all video frames within a preset time period, or extracting a video frame through a random algorithm;
converting image data of the target video frame from a red-green-blue (RGB) format to a luma and chroma (YUV) format;
superimposing, in the YUV format, an offset with a preset value on a pixel value of a pixel point corresponding to a shape to be watermarked on the target video frame; and
encoding the target video frame on which the offset is superimposed to output the original video containing the encoded target video frame;
wherein superimposing the offset with the preset value on the pixel value of the pixel point corresponding to the shape to be watermarked on the target video frame comprises:
determining a target area to be watermarked on the target video frame, wherein the target area is a corresponding area on an image of the target video frame determined according to a display content on a user operation interface displaying the target video frame; and
superimposing the offset with the preset value on the pixel value of the pixel point corresponding to the shape to be watermarked on the target area of the target video frame.

2. The method of claim 1, wherein superimposing the offset with the preset value on the pixel value of the pixel point corresponding to the shape to be watermarked on the target area of the target video frame comprises:
superimposing the offset with the preset value on U-channel data or V-channel data of the pixel point corresponding to the shape to be watermarked on the target area of the target video frame.

3. The method of claim 1, wherein the pixel point on which the offset is superimposed further has following characteristics:
a difference value between the pixel value of the pixel point and an average value of pixel values of a plurality of pixel points in a neighborhood of the pixel point does not exceed a preset threshold.

4. The method of claim 1, further comprising:
in a case where a watermark needs to be detected, reading and decoding image data of the watermarked target video frame, extracting U-channel data or V-channel data of the YUV format obtained after decoding, and detecting an existence of the watermark by increasing a contrast.

5. An apparatus for video watermarking, comprising:
a processor and a memory; wherein the memory is configured to store at least one program which, when executed by the processor, implements:
determining, from an original video, a video frame to be watermarked in a preset manner to be a target video frame, wherein the preset manner comprises one of the following: extracting a video frame every predetermined number of frames, extracting all video frames within a preset time period, or extracting a video frame through a random algorithm;
converting image data of the target video frame from a red-green-blue (RGB) format to a luma and chroma (YUV) format;
superimposing, in the YUV format, an offset with a preset value on a pixel value of a pixel point corresponding to a shape to be watermarked on the target video frame; and
encoding the target video frame on which the offset is superimposed to output the original video containing the encoded target video frame;
wherein the at least one program, when executed by the processor, implements superimposing the offset with the preset value on the pixel value of the pixel point corresponding to the shape to be watermarked on the target video frame by:
determining a target area to be watermarked on the target video frame, wherein the target area is a corresponding area on an image of the target video frame determined according to a display content on a user operation interface displaying the target video frame; and
superimposing the offset with the preset value on the pixel value of the pixel point corresponding to the shape to be watermarked on the target area of the target video frame.

6. The apparatus of claim 5, wherein the at least one program, when executed by the processor, implements superimposing, in the YUV format, the offset with a preset value on the pixel value of the pixel point corresponding to the shape to be watermarked on the target area of the target video frame by:
superimposing the offset with the preset value on U-channel data or V-channel data of the pixel point corresponding to the shape to be watermarked on the target area of the target video frame.

7. The apparatus of claim 5, wherein the pixel point on which the offset is superimposed further has following characteristics:
a difference value between the pixel value of the pixel point and an average value of pixel values of a plurality of pixel points in a neighborhood of the pixel point does not exceed a preset threshold.

8. The apparatus of claim 5, wherein the at least one program, when executed by the processor, further implements:
in a case where a watermark needs to be detected, reading and decoding image data of the watermarked target video frame, extracting U-channel data or V-channel data of the YUV format obtained after decoding, and detecting an existence of the watermark by increasing a contrast.

9. A non-transitory computer-readable storage medium, storing a computer program, wherein the computer program, when executed by a processing apparatus, implements the following:
determining, from an original video, a video frame to be watermarked in a preset manner to be a target video frame, wherein the preset manner comprises one of the following: extracting a video frame every predetermined number of frames, extracting all video frames within a preset time period, or extracting a video frame through a random algorithm;
converting image data of the target video frame from a red-green-blue (RGB) format to a luma and chroma (YUV) format;
superimposing, in the YUV format, an offset with a preset value on a pixel value of a pixel point corresponding to a shape to be watermarked on the target video frame; and
encoding the target video frame on which the offset is superimposed to output the original video containing the encoded target video frame;
wherein the computer program, when executed by the processing apparatus, implements superimposing the offset with the preset value on the pixel value of the pixel point corresponding to the shape to be watermarked on the target video frame by:
  determining a target area to be watermarked on the target video frame, wherein the target area is a corresponding area on an image of the target video frame determined according to a display content on a user operation interface displaying the target video frame; and
  superimposing the offset with the preset value on the pixel value of the pixel point corresponding to the shape to be watermarked on the target area of the target video frame.

10. The method of claim 2, wherein the pixel point on which the offset is superimposed further has following characteristics:
  a difference value between the pixel value of the pixel point and an average value of pixel values of a plurality of pixel points in a neighborhood of the pixel point does not exceed a preset threshold.

11. The apparatus of claim 6, wherein the pixel point on which the offset is superimposed further has following characteristics:
  a difference value between the pixel value of the pixel point and an average value of pixel values of a plurality of pixel points in a neighborhood of the pixel point does not exceed a preset threshold.

12. The storage medium of claim 9, wherein the computer program, when executed by the processing apparatus, implements superimposing, in the YUV format, the offset with a preset value on the pixel value of the pixel point corresponding to the shape to be watermarked on the target area of the target video frame by:
  superimposing the offset with the preset value on U-channel data or V-channel data of the pixel point corresponding to the shape to be watermarked on the target area of the target video frame.

13. The storage medium of claim 9, wherein the pixel point on which the offset is superimposed further has following characteristics:
  a difference value between the pixel value of the pixel point and an average value of pixel values of a plurality of pixel points in a neighborhood of the pixel point does not exceed a preset threshold.

14. The storage medium of claim 12, wherein the pixel point on which the offset is superimposed further has following characteristics:
  a difference value between the pixel value of the pixel point and an average value of pixel values of a plurality of pixel points in a neighborhood of the pixel point does not exceed a preset threshold.

15. The storage medium of claim 9, wherein the computer program, when executed by the processing apparatus, further implements:
  in a case where a watermark needs to be detected, reading and decoding image data of the watermarked target video frame, extracting U-channel data or V-channel data of the YUV format obtained after decoding, and detecting an existence of the watermark by increasing a contrast.

* * * * *